(12) United States Patent
Cook et al.

(10) Patent No.: US 6,691,256 B1
(45) Date of Patent: Feb. 10, 2004

(54) NETWORK PROBLEM INDICATION

(75) Inventors: Mark Douglas Cook, St Albans (GB); Lee Anthony Walker, Watford (GB); Simon Peter Valentine, Hemel Hempstead (GB); Russell Kennett Bulmer, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/527,635

(22) Filed: Mar. 17, 2000

(30) Foreign Application Priority Data

Jun. 10, 1999 (GB) ............................................. 9913531

(51) Int. Cl.[7] ............................. G06F 11/00; H04L 1/22
(52) U.S. Cl. ......................................... 714/43; 709/224
(58) Field of Search ............................... 714/43, 47, 48, 714/57, 28, 30, 31, 37, 39, 44, 46, 38; 709/223, 224

(56) References Cited

U.S. PATENT DOCUMENTS

| | | | | |
|---|---|---|---|---|
| 5,377,196 A | * | 12/1994 | Godlew et al. | 371/20.1 |
| 5,436,909 A | | 7/1995 | Dev et al. | 371/20.1 |
| 5,471,399 A | | 11/1995 | Tanaka et al. | 364/491 |
| 5,748,880 A | * | 5/1998 | Ito et al. | 395/183.22 |
| 5,913,036 A | * | 6/1999 | Brownmiller et al. | 395/200.54 |
| 6,006,016 A | * | 12/1999 | Faigon et al. | 395/185.01 |
| 6,173,422 B1 | * | 1/2001 | Kimura et al. | 714/57 |
| 6,178,531 B1 | * | 1/2001 | Kolb | 714/715 |
| 6,269,401 B1 | * | 7/2001 | Fletcher et al. | 709/224 |
| 6,327,677 B1 | * | 12/2001 | Garg et al. | 714/37 |

FOREIGN PATENT DOCUMENTS

| | | | |
|---|---|---|---|
| EP | 0 810 756 A2 | 12/1997 | H04L/12/24 |
| GB | 2 286 317 A | 8/1995 | H04L/12/26 |
| GB | 2 328 043 A | 2/1999 | G06F/17/30 |
| WO | WO 97/35409 | 9/1997 | H04L/12/56 |
| WO | WO 98/25377 | 6/1998 | H04L/12/24 |

* cited by examiner

*Primary Examiner*—Nadeem Iqbal
(74) *Attorney, Agent, or Firm*—McDonnell Boehnen Hulbert & Berghoff

(57) ABSTRACT

Network supervising apparatus, computer program, and method of supervising a network comprising:
- applying an algorithm to information relating to the devices of the network to provide a stress value,
- comparing the stress value with a predetermined limit, retrieving graphic symbol signals from a signal store and providing the graphic symbol on a visual display apparatus when the stress value reaches the predetermined limit,
- manually selecting the graphic symbol and causing said visual display apparatus to provide an image indicating where the stress value has reached the predetermined limit.

57 Claims, 2 Drawing Sheets

NETWORK PROBLEM INDICATION

BACKGROUND OF THE INVENTION

The present invention relates to supervising a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use.

In co-pending UK patent applications numbers 9910838.3 and 9910837.5 (each in the name of the assignee of the present application) which are incorporated herein, we describe various arrangements for providing interrogation of the devices of the network to thereby produce on a network manager's workstation details of the network and its operation (preferably in the form of a network map which may be displayed on a visual display unit showing the devices and links between the devices). At its simplest, and where the device is a "managed" device, this information is usually provided by interrogation using a known protocol, such as the SNMP protocol, of the so-called 'agent' of each device which stores the device's unique MAC address, the type of device and the MAC addresses of the devices which are connected to the ports directly or indirectly.

In our UK patent application 9910838.3 in particular there is disclosed a system which monitors a plurality of stress values or so-called "stress metrics" for the managed devices on the network and provides an overall stress value for each device or alternatively an overall stress value for the network as a whole. (There may also be stress values or metrics for components, eg chassis blades or ports of the device.)

Particularly where the network is a smaller network than would warrant a full time network manager, it is desirable for the network supervisor to be able to use his workstation for other tasks than network management and whilst the network supervisor is engaged in these other tasks, it is desirable if an indication can be given to the network supervisor that certain events, such as, but not exclusively, problems have occurred on the network. By "problems" we mean matters to which the network supervisor would like to give his attention and may include trivial or serious problems or other events.

Typical problems which may affect the performance of the network include:

1. Slow operating of the speed of the network, and individual network devices, leading to slow movement of data traffic across the network, indicated by, for example, slow response time for a given network device;
2. High volumes of data traffic on the network due to, for example, over utilisation of the networks links, network devices, and the network as a whole; and
3. High error rates in the transmission of data packets across the network, indicated by, for example, the loss of data packets in a network device and errors in received data packets.

SUMMARY OF THE INVENTION

The present invention provides a network supervising apparatus comprising:
   arithmetic apparatus for applying an algorithm to information relating to the devices of the network to provide a stress value,
   a comparator to compare the stress value with a predetermined limit,
   a processing unit to retrieve graphic symbol related signals from a signal store and to provide the graphic symbol on the visual display apparatus when the stress value reaches the predetermined limit,
   a manual selector for selecting the graphic symbol and causing said visual display apparatus to provide an image indicating where the stress value has reached the predetermined limit.

The present invention may also provide a computer program on a computer readable medium or embodied in a carrier wave for use in supervising a network, said program comprising:
   program step or means for applying an algorithm to information relating to the devices of the network to provide a stress value,
   program step or means to compare the stress value with a predetermined limit,
   program step or means for retrieving graphic symbol signals from a signal store and for providing the graphic symbol on a visual display apparatus when the stress value reaches the predetermined limit,
   program step or means actuated by manually selecting the graphic symbol to cause said visual display apparatus to provide an image indicating where the stress value has reached the predetermined limit.

The present invention also provides a method of supervising a network comprising:
   applying an algorithm to information relating to the devices of the network to provide a stress value,
   comparing the stress value with a predetermined limit,
   retrieving graphic symbol signals from a signal store and providing the graphic symbol on a visual display apparatus when the stress value reaches the predetermined limit,
   manually selecting the graphic symbol and causing said visual display apparatus to provide an image indicating where the stress value has reached the predetermined limit.

BRIEF DESCRIPTION OF THE DRAWINGS

Preferred embodiments of the invention will now be described by way of example only with reference to the accompanying drawings in which.

DESCRIPTION OF THE PREFERRED EMBODIMENTS

Figure 1:
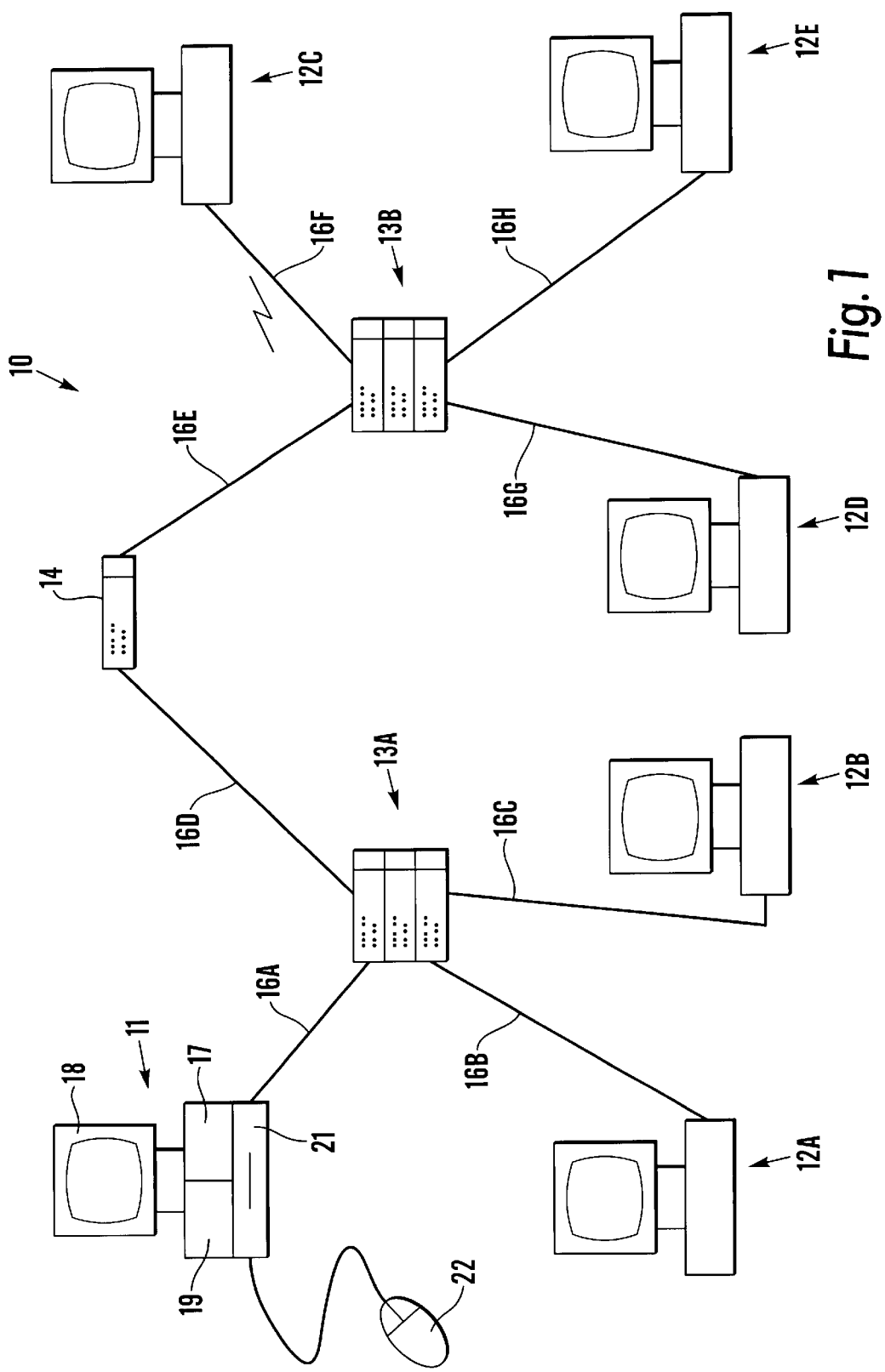
FIG. 1 is a diagrammatic view of a network incorporating a preferred embodiment of the invention, and FIG. 2 sets out the program steps in accordance with the preferred embodiment of the invention.
Figure 2:
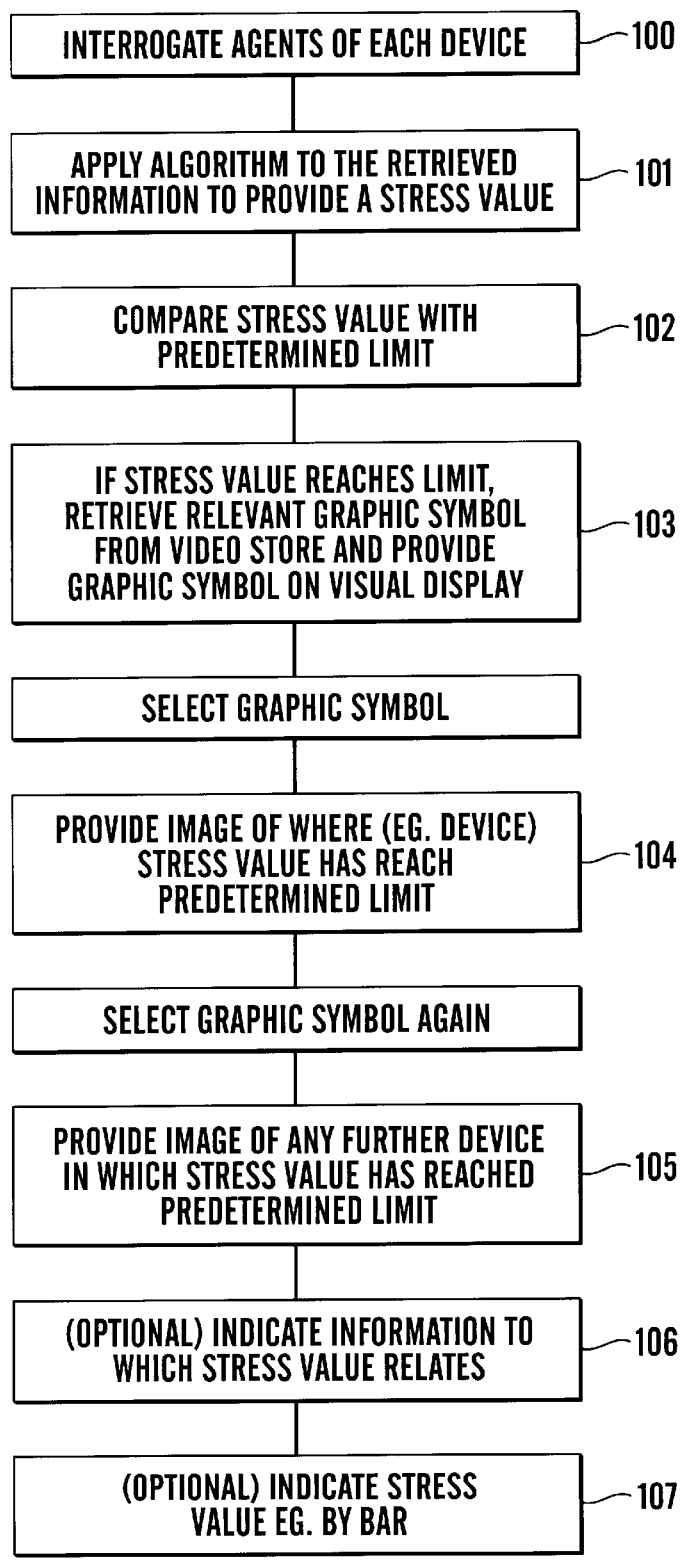

Referring to FIG. 1 there is shown a network 10 comprising a plurality of devices in the form of a network supervisor's workstation or computer 11, other workstations 12B–E, hubs 13A, 13B, and switch 14. The network is a simple network and is set out for purposes of illustration only. Other configurations and arrangements, may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

By means which is disclosed in the co-pending patent applications referred to above, the network supervisor's computer 11 may interrogate and analyse the network, and store in the memory 17 the information relating to the devices within the network and the links between the devices. In essence, most quality devices include a so-called agent which stores information about the device such as how many ports it has and how they are connected, and the address to which at least some of the ports are connected, and its unique MAC number, its Sys Object ID which identifies what the device is and what model type it is. The computer 11 interrogates the agents of each device.

In a preferred arrangement, the computer 11 may, on command from the selector 22, process signals from the memory 17 by the signal processor 19 and provide on the visual display unit 18 a network map showing each of the devices and the links therebetween. In the examples shown, the network is simple but of course in many instances the network will be considerably more complex and it may be necessary to arrange that the visual display unit 18 only shows a simplified version or only part of the network at any one time.

In addition to the above and as described in our co-pending UK patent application 9910838.3 the computer 11 includes arithmetic means to apply an algorithm to the information received by the interrogation of the agents of the devices to provide stress values for parts of each managed device (eg each port or each chassis blade) and/or for each managed devices on the network and/or for parts of the network and/or for the network as a whole. The computer 11 includes an arithmetic means to compare the or each stress value with a relevant predetermined threshold limit and provide a stress metric. The threshold limit may be selected by the network manager himself or may be pre set by the program.

In other known network management arrangements, the network manager's computer is dedicated to network management and it is known to provide a visible indication of faults in the network. The prior systems are designed, however, to operate with large networks having one or more full time dedicated network managers. In the present case, whilst the network is operating, the network manager may carry out other tasks by running other unrelated programs on his computer 11. However, it is desirable for him to be warned when the stress value for any individual device or for the network as a whole reaches or exceeds the threshold limit, even whilst he is carrying out completely unrelated tasks on his computer 11.

The arrangement is such that whilst the network manager is using his workstation for other tasks, and in particular for tasks involving Windows (RTM) software, an indication should be provided on the screen to alert the network manager when the stress value of the network, part of the network (eg a branch), a device, or part of a device (eg a port or a chassis blade) reaches the predetermined limit. This provides substantial technical benefit in the operation of a network and is particularly useful when the network manager does not manage the network full time (eg where the network is small or relatively small). It will be seen therefore that the preferred arrangement allows the benefits of a large network with a full time manager to be applied to a smaller network where it is not sensible to employ a full time manager but allows a person with other duties to act part time as network manager and be warned of network problems whilst carrying out other computer based tasks, i.e. running other unrelated programs on his computer.

Whilst such an indication can be provided in a variety of ways, it is preferred that the indication be in the form of a graphic symbol which appears on the network manager's screen, no matter what program he is running at the time. Preferably, it will appear in a predetermined set place on the screen so as to be obvious and recognisable. Particularly conveniently, the graphic symbol may appear in the so called "system tray" (which is provided in the form of a bar at the bottom of the Windows screen) or application status bar in the Windows screen. The Windows software includes a sub program which may be invoked to provide a graphic symbol in the system tray or application status bar.

Thus the computer 11 includes in its memory 17 (or elsewhere) signals relating to a relevant graphic symbol (which might be an icon or may be a text message such as "NETWORK PROBLEM") which may be chosen by the network vendor, and the software operated by the computer 11 includes a link to the necessary Windows software so that when the arithmetic apparatus calculates that the stress metric of a single device or network reaches or exceeds a predetermined limit, the signals relating to the graphic symbol are retrieved and a graphic symbol is displayed in the system tray of the Windows display.

The software is then arranged such that when the network manager uses the mouse to move a pointer to the relevant graphic symbol and clicks on the mouse, the existing Windows display is overlaid with a display from the network management software which provides details of the network problem.

This display may be simply in the form of a text message indicating the particular device, part of a device or part of the network which has reached the predetermined stress level, or may provide the network map or relevant part of the network map with the relevant device or devices highlighted, or may simply display an enlarged view of the relevant device.

There will frequently be more than one device affected (eg when there is an overload) and successive clicks on the icon will similarly identify successively the relevant devices.

In this way the network manager can allow the network to run and only needs to deal with the network when a problem is indicated by means of the relevant graphic symbol in the system tray or application status bar of the Windows display.

In addition to providing an image of the relevant device, there may be provided an image of the "stress bar" referred to in our co-pending UK patent application 9910837.5. This will give the network manager a clearer indication of the level of stress in respect of that particular device.

We have described how the network may be supervised. The preferred method of the invention is carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source via, for example, a telephone line, a wireless radio or infra-red link, in each of which cases it may be embodied in a carrier wave and used to control the processor to carry out the steps of the invention as described.

The program may include, a program step or means (100) for interrogating the agents of each device, a program step or means (101) for applying an algorithm to the information relating to the devices interrogated to provide a stress value, program step or means (102) to compare the stress value with a predetermined limit, program step or means (103) for retrieving graphic symbol signals from a signal store and for providing the graphic symbol on the visual display apparatus when the stress value reaches the predetermined limit (even if the workstation is running another program and the visual display apparatus is displaying a visual display controlled by an unrelated program), program means (104) actuated by the mouse or its equivalent selecting the graphic symbol and causing the visual display on the visual display apparatus to change to provide an image indicating where the stress value has reached the predetermined limit, program means (105) actuated by successive selections of the graphic symbol by the mouse to display further devices in which the stress value has reached a predetermined limit, (optionally) program means (106) to indicate the information to which the stress value relates, and (optionally) program means (107) to indicate the value of the stress value (eg by means of the bar described in UK patent application 9910837.5)

Program step (100) may be provided by another program.

Thus the preferred arrangement of the invention allows the application to visually inform the network manager when network problems occur and allows the user to pinpoint the relevant devices causing these problems simply by clicking on the graphic symbol. This reduces the amount of time taken to resolve network problems by allowing the network manager to find out immediately which devices are at fault. By displaying the symbol in either the status bar or Windows system tray, the user does not constantly have to scan the network map to determine if errors have occurred. The use of the Windows system tray allows the user to keep track of network problems whilst using the workstation for other tasks.

The invention is not restricted to the details of the foregoing example.

What is claimed is:

1. A network supervising apparatus comprising:

a computer capable of running a plurality of programs, said computer including, arithmetic apparatus (i) applying, whilst said computer is running a network supervising program, an algorithm to information relating to the devices of a network to provide a stress value; and (ii) comparing the stress value with a predetermined limit, a processing unit retrieving graphic symbol related signals from a signal store and providing the graphic symbol on the visual display apparatus when the stress value reaches the predetermined limit, said processing unit being operable to provide said graphic symbol on the visual display apparatus when said computer is running an unrelated program, and a selector selecting the graphic symbol and causing the visual image displayed on said visual display apparatus to change to provide an image indicating where the stress value has reached the predetermined limit.

2. A network supervising apparatus further comprising interrogation means interrogating agents of the devices of the network to provide the information for the arithmetic means.

3. A network supervising apparatus as claimed in claim 1 in which the graphic symbol comprises a text message.

4. A network supervising apparatus as claimed in claim 1 in which the graphic symbol comprises an icon.

5. A network supervising apparatus as claimed in claim 1 in which the graphic symbol is provided in a set predetermined position on the visual display on the visual display apparatus.

6. A network supervising apparatus as claimed in claim 1 in which the visual display apparatus displays a Windows based display and the graphic symbol is provided in the system tray.

7. A network supervising apparatus as claimed in claim 1 in which the visual display apparatus displays a Windows based display and the graphic symbol is provided in the application status bar.

8. A network supervising apparatus as claimed in claim 1 in which the stress value relates to a port of a device.

9. A network supervising apparatus as claimed in claim 1 in which the stress value relates to a chassis blade of a device.

10. A network supervising apparatus as claimed in claim 1 in which the stress value relates to a device.

11. A network supervising apparatus as claimed in claim 1 in which the stress value relates to part of the network.

12. A network supervising apparatus as claimed in claim 1 in which the stress value relates to the speed of operation of the relevant part of the network.

13. A network supervising apparatus as claimed in claim 1 in which the stress value relates to the error rate in the transmission of data packets of the relevant part of the network.

14. A network supervising apparatus as claimed in claim 1 in which the stress value relates to the volume of data traffic on the relevant part of the network.

15. A computer program on a computer readable medium for use in supervising a network, said program comprising:

program step for applying an algorithm to information relating to the devices of a network to provide a stress value, program step to compare the stress value with a predetermined limit, program step for retrieving graphic symbol signals from a signal store and for providing the graphic symbol on a visual display apparatus when the stress value reaches the predetermined limit and whilst said visual display apparatus is displaying a visual display controlled by an unrelated program, program step actuated by manually selecting the graphic symbol to cause said visual display on said visual display apparatus to change to provide an image indicating where the stress value has reached the predetermined limit.

16. A computer program as claimed in claim 15 including an initial program step to interrogate agents of the devices of the network to provide the information to which the algorithm is to be applied.

17. A computer program as claimed in claim 15 in which the graphic symbol comprises a text message.

18. A computer program as claimed in claim 15 in which the graphic symbol comprises an icon.

19. A computer program as claimed in claim 15 in which the visual display apparatus displays a Windows based display and the graphic symbol is provided in the system tray.

20. A network supervising apparatus as claimed in claim 1 in which the graphic symbol is provided in a set predetermined position on the visual display on the visual display apparatus.

21. A computer program as claimed in claim 15 in which the visual display apparatus displays a Windows based display and the graphic symbol is provided in the application status bar.

22. A computer program as claimed in claim 15 in which the stress value relates to a port of a device.

23. A computer program as claimed in claim 15 in which the stress value relates to a chassis blade of a device.

24. A computer program as claimed in claim 15 in which the stress value relates to a device.

25. A computer program as claimed in claim 15 in which the stress value relates to part of the network.

26. A computer program as claimed in claim 15 in which the stress value relates to the speed of operation of the relevant part of the network.

27. A computer program as claimed in claim 15 in which the stress value relates to the error rate in the transmission of data packets of the relevant part of the network.

28. A computer program as claimed in claims 15 in which the stress value relates to the volume of data traffic on the relevant part of the network.

29. A method of supervising a network comprising:
    applying an algorithm to information relating to the devices of a network to provide a stress value,
    comparing the stress value with a predetermined limit,
    retrieving graphic symbol signals from a signal store and providing the graphic symbol on a visual display apparatus when the stress value reaches the predetermined limit and whilst said visual display apparatus is displaying a visual display controlled by an unrelated program,
    manually selecting the graphic symbol and causing said visual display on said visual display apparatus to change to provide an image indicating where the stress value has reached the predetermined limit.

30. A method as claimed in claim 29 including an initial step of interrogating agents of the devices of the network to provide the information to which the algorithm is applied.

31. A method as claimed in claim 29 in which the graphic symbol comprises a text message.

32. A method as claimed in claim 29 in which the graphic symbol comprises an icon.

33. A method as claimed in claim 1 in which the graphic symbol is provided in a set predetermined position on the visual display on the visual display apparatus.

34. A method as claimed in claim 29 in which the visual display apparatus displays a Windows based display and the graphic symbol is provided in the system tray.

35. A method as claimed in claim 29 in which the visual display apparatus displays a Windows based display and the graphic symbol is provided in the application status bar.

36. A method as claimed in claim 29 in which the stress value relates to a port of a device.

37. A method as claimed in claim 29 in which the stress value relates to a chassis blade of a device.

38. A method as claimed in claim 29 in which the stress value relates to a device.

39. A method as claimed in claim 29 in which the stress value relates to part of the network.

40. A method as claimed in claim 29 in which the stress value relates to the speed of operation of the relevant part of the network.

41. A method as claimed in claim 29 in which the stress value relates to the error rate in the transmission of data packets of the relevant part of the network.

42. A method as claimed in claim 29 in which the stress value relates to the volume of data traffic on the relevant part of the network.

43. A computer program on a computer readable medium, said computer program comprising software for performing the method of claim 29.

44. A computer program embodied in a carrier wave for use in supervising a network, said program comprising:
    program step for applying an algorithm to information relating to the devices of a network to provide a stress value,
    program step to compare the stress value with a predetermined limit,
    program step for retrieving graphic symbol signals from a signal store and for providing the graphic symbol on a visual display apparatus when the stress value reaches the predetermined limit and whilst said visual display apparatus is displaying a visual display controlled by an unrelated program,
    program step actuated by manually selecting the graphic symbol to cause said visual display on said visual display apparatus to change to provide an image indicating where the stress value has reached the predetermined limit.

45. A computer program as claimed in claim 44 including an initial program step to interrogate agents of the devices of the network to provide the information to which the algorithm is to be applied.

46. A computer program as claimed in claim 44 in which the graphic symbol comprises a text message.

47. A computer program as claimed in claim 44 in which the graphic symbol comprises an icon.

48. A network supervising apparatus as claimed in claim 44 in which the graphic symbol is provided in a set predetermined position on the visual display on the visual display apparatus.

49. A computer program as claimed in claim 44 in which the visual display apparatus displays a Windows based display and the graphic symbol is provided in the system tray.

50. A computer program as claimed in claim 44 in which the visual display apparatus displays a Windows based display and the graphic symbol is provided in the application status bar.

51. A computer program as claimed in claim 44 in which the stress value relates to a port of a device.

52. A computer program as claimed in claim 44 in which the stress value relates to a chassis blade of a device.

53. A computer program as claimed in claim 44 in which the stress value relates to a device.

54. A computer program as claimed in claim 44 in which the stress value relates to part of the network.

55. A computer program as claimed in claim 44 in which the stress value relates to the speed of operation of the relevant part of the network.

56. A computer program as claimed in claim 44 in which the stress value relates to the error rate in the transmission of data packets of the relevant part of the network.

57. A computer program as claimed in claims 44 in which the stress value relates to the volume of data traffic on the relevant part of the network.

* * * * *